United States Patent [19]

Garrett, Jr.

[11] 4,393,155
[45] Jul. 12, 1983

[54] ENHANCED VISCOSITY MAINTENANCE AND DEMULSIBILITY IN ASPHALT EMULSIONS

[75] Inventor: William R. Garrett, Jr., Catlettsburg, Ky.

[73] Assignee: Ashland Oil, Inc., Ashland, Ky.

[21] Appl. No.: 408,368

[22] Filed: Aug. 13, 1982

[51] Int. Cl.$^3$ .............................................. C08K 3/20
[52] U.S. Cl. ....................................... 524/60; 524/69
[58] Field of Search .................................. 524/60, 69

[56] References Cited

U.S. PATENT DOCUMENTS

| | | | |
|---|---|---|---|
| 2,941,893 | 6/1960 | McConnaughay | 524/60 |
| 3,785,852 | 1/1974 | Schleidt | 524/60 |
| 3,843,576 | 10/1974 | Parkinson | 524/60 |
| 4,176,102 | 11/1979 | Favata | 524/60 |
| 4,293,459 | 10/1981 | Detroit | 524/60 |

OTHER PUBLICATIONS

1 Encycl. Polymer Science and Tech., p. 192, (1964).
AASHTO Materials, Part I, 12th Ed., (1978).
Nalco Material Safety Data Sheet, Nalco ISS-893.
Reichhold Technical Bulletin "Tychem 97/667", 6/82.
International Patent Research Office Abstract 15001.

*Primary Examiner*—Melvyn I. Marquis
*Attorney, Agent, or Firm*—Richard C. Willson, Jr.

[57] ABSTRACT

Improved viscosity maintenance properties and high demulsibility values are provided by asphalt-in-water emulsions; e.g., RS-2 comprising in combination asphalt, emulsifiers and polyacrylamides having molecular weights above about 100,000.

10 Claims, 1 Drawing Figure

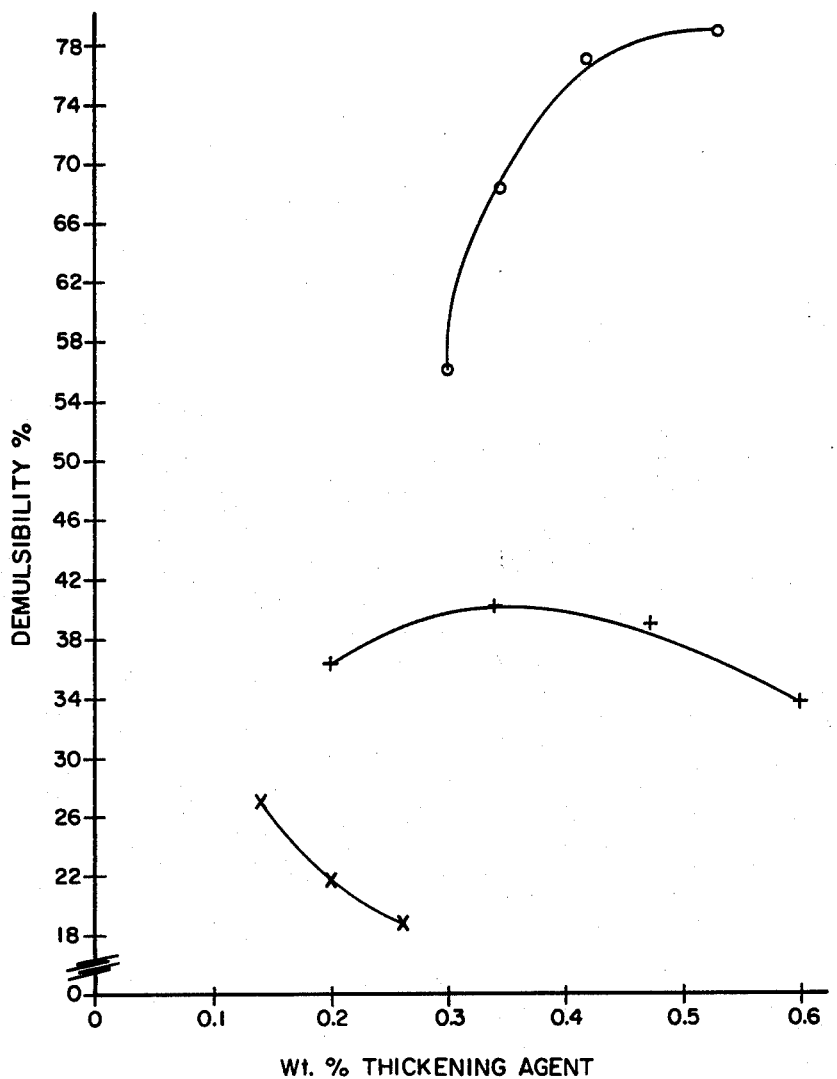

ENHANCED VISCOSITY MAINTENANCE AND DEMULSIBILITY IN ASPHALT EMULSIONS

BACKGROUND OF THE INVENTION

1. Field of the Invention

The present invention relates to the field of asphalt emulsions and improvers therefore, commonly classified in U.S. Patent Office Class 106, Subclass 277 or Class 260, Subclasses 28R and 28.5.

2. Description of the Prior Art

Among the wide variety of formulation problems constantly faced by the asphalt road building industry and its suppliers with respect to asphalt-in-water emulsions are:

A. Viscosity (ASTM D244 test).
B. Storage stability (ASTM D244), the ability to maintain the integrity of the emulsion by prevention of settling and/or creaming in which ingredients selectively move to the bottom or top respectively).
C. Coating ability (ASTM D244), the ability to coat the particles of the road-building aggregate.
D. Demulsibility, (ASTM D244), ability of the emulsion to break in the presence of polyvalent metals and other demulsification agents so as to "set" in the presence of stone or calcium chloride.
E. Sieve, (ASTM D244), resistance to agglomeration between the individual particles in the emulsion with consequent settling and loss of homogenity).
F. Viscosity Maintenance: (change in ASTM D244 viscosity with time), the prevention of substantial fluctuations in viscosity during storage of the asphalt emulsions.

The prior art has addressed quite thoroughly each of the first three of the problems listed above, i.e. viscosity, storage stability, coating ability.

For example various solutions to the problem have been taught by U.S. Patents as follows: U.S. Pat. No. 3,785,852 to Schleidt which teaches use of polyvinyl alcohol as a stabilizer for a bituminous emulsion (e.g. column 2, line 60+); U.S. Pat. No. 2,941,893 to McConnaughay which teaches asphalt emulsions containing hydroxypropylmethyl cellulose (e.g. column 1, lines 47+); U.S. Pat. No. 3,843,576 to Parkinson which discloses using an ethylene-acid copolymer in a composition also containing a phenolic resin and coal tar pitch or the like in the form of dispersions (e.g. column 5, lines 34+); U.S. Pat. No. 4,176,102 to Favata which teaches acrylic-acid polymers and p. 192 of volume 1 of the 1964 edition of *Encyclopedia of Polymer Science and Technology*, Table 5, which discloses use of polyacrylamides as "emulsion stabilizers and thickening agents".

However, the remaining three problems listed above have continued to trouble the industry and to produce serious defects in roads prepared with asphalt emulsions under particularly adverse weather conditions. For example, demulsibility characteristics have frequently proven insufficient in otherwise satisfactory asphalt emulsions and have permitted a loss of aggregate in roads subjected to heavy rains prior to their having been fully set in the presence of stone and other aggregate components.

Also, because asphalt emulsions are often prepared on a seasonal basis and must be therefore frequently stored for relatively long periods prior to use, segregation or lessening of viscosity may cause emulsions which were of good quality when manufactured to fall below industry specifications after prolonged storage. Viscosity increases during storage can deter the application of the asphalt emulsions by conventional spraying techniques and viscosity decreases can sharply reduce the bonding and coating characteristics of the asphalts when applied to the aggregates. Where the viscosity is too low (the asphalt emulsion is too "thin"), the asphalt emulsion may itself run off the road, away from the aggregate and destroy surrounding vegetation.

The importance of "sieve" should not be underestimated—low viscosity asphalt emulsions often exhibit a tendency to segregate due to agglomeration of individual particles within the emulsion and consequent settling and/or nozzle-plugging of the distributors used for applying the emulsion to the road bed.

The basic method of attainment of desired viscosity is the addition of higher percents of asphalt to the emulsion. Alternatively, and at much lower cost, aqueous sodium chloride can be injected into a non-polar, asphaltic emulsion medium to increase the viscosity of the asphalt emulsion.

SUMMARY

General Statement of the Invention

According to the present invention, sodium chloride injection is eliminated thus decreasing the chance for the asphalt emulsion particles to collapse into unwanted "sieve" (agglomerates) via diffusion of the salt solution into the aqueous phase. The invention also provides the advantage of decreased asphalt level in emulsions, e.g. about a five percent reduction, in Rapid Setting emulsion (RS-1, RS-2, etc.) with consequent savings in materials cost. The invention also allows decreased asphalt levels in Slow and Medium Setting emulsions.

Most important, the invention addresses the triple problems of demulsification, viscosity maintenance and sieve without sacrificing viscosity, storage stability and coating ability.

According to the present invention, asphalt emulsions are prepared by formulating a liquid phase comprising water, emulsifying agents compatible with the emulsion to be formed, acrylic polymers, and asphalt. The choice of acrylic polymers provides the advantages of viscosity maintenance, demulsibility and sieve reduction discussed above.

BRIEF DESCRIPTION OF THE DRAWINGS

The drawing is a graphic representation showing the superior demulsification of the invention.

DETAILED STATEMENT OF INVENTION

Starting Materials:

Asphalt:

The asphalts used with the present invention are not narrowly critical and may range from grades AC20 of the American Association of State Highways and Transportation Officials (AASHTO) through grades AC4, AC10, AC20 and even AC40, although grades between AC5 and AC20 will be more preferred and grades AC5 and AC10 will be most preferred. These grades are more fully described in "AASHTO Materials", Part 1-Specifications A.G. the 12th edition (1978) published by the American Association of State Highway and Transportation Officials. "Emulsion base" grade asphalt is particularly useful for the invention and corresponds roughly to AASHTO grade AC2.5. Pseudoasphalts; e.g., those synthesized by mixing together very high boiling petroleum fractions; e.g., asphaltic pitch mixed with slurry oil, frequently do not provide asphalt emulsions which meet the storage stability tests apparently because they are actually composed of two different hydrocarbon ranges, and these should be avoided, although they are reasonably satisfactory when used in "hot mix" asphalts.

From about 50% to about 80% by weight of asphalt will generally be employed in the finished emulsion. This percentage is based on the total weight of the emulsion and is not narrowly critical; e.g., the more preferred range will be from about 58 to about 70% asphalt with the most preferred range being about 62 to about 68% asphalt.

Emulsifying Agents

Emulsifying agents for use with the present invention should be carefully selected and must obviously have the ability to emulsify the chosen asphalt into water in the proper proportions and to form a reasonably stable emulsion. Suitable emulsifying agents include tall oil, the most preferred of the emulsifying agents, with synthetic emulsifying agents; e.g., sodium alkyl aryl sulfonates such as sodium dodecyl benzene sulfonate being somewhat less preferred because of its relative expense. Semi-synthetic surfactants; e.g., tall oil sulfonates can be used with the formulations of the invention. The emulsifying agent will generally be present in the finished emulsion in the range from about 0.25 to about 5, more preferably from about 0.35 to about 3 and most preferably from about 0.53 to about 1.7% by weight based on the total weight of emulsion. A percentage of emulsifying agent will be dependent primarily on the emulsifying ability of the agent chosen; e.g., certain high performance synthetic surfactants such as flurocarbon surfactants being required only in minute amounts with tall oil being usually employed in the range from about 0.53 to about 1.7% by weight. Tall oil is not, of course, itself a surface active agent and must be saponified with alkali; e.g., sodium hydroxide in an amount of about 0.9 to about 1.5, more preferably about 1 to about 1.2 and most preferably about 1.01 to about 1.1 moles of saponifying agent per mole of tall oil. Tall oil is a mixture of fatty acids and certain resin acids. Other natural organic acid sources are; e.g., Jojoba oil, sperm oil and even tallow. Corn oil, safflower oil, peanut oil, and olive oil acids can be substituted for tall oil in the formulations of the present invention where economically expedient.

Rapid-Set (RS) types of asphalt emulsions will require lesser amounts of emulsifier.

Water

The water employed with the asphalt emulsions will, of course, be ordinary tap water or potable water. Demineralization, while of some minor value, would generally be too expensive a process for preparation of water emulsions of asphalts. One contaminant to avoid is aluminum sulfate (alum) employed by many municipal water treatment facilities which frequently remains in the treated tap water. The aluminum content of such water can interfere with the alkali; e.g., sodium hydroxide used to saponify the tall oil and therefore should be avoided as should all poly-valent metal contaminants. Poly-valent metal compounds are themselves demulsifying agents. Calcium chloride is generally added to emulsions to evaluate their relative resistance to demulsification.

Water will generally be present in an amount of about 28 to about 65, more preferably from about 30 to about 50 and most preferably from about 37 to about 43% by weight based on the total weight of the emulsion being prepared.

Polymers

A wide variety of polymers may be used as thickening agents for asphalt emulsions. It has been found that by careful selection of a relatively small group chosen from the wide variety of possible polymers, the beneficial results of the invention can be obtained without undue sacrifice in economy. The economy of asphalt emulsions there as mentioned—at the time of filing these patent applications these products are selling commercially in the range of roughly 70-80 cents per gallon, obviates the use of exotic or particularly expensive components. In fact, the use of water in place of the solvents employed in the "cut-back asphalt" used nearly universally in years past provides the economic and environmental advantages which have supplanted the "cut-backs".

Accordingly, economic considerations (based on unit cost/performance data) rule out certain otherwise promising thickening agents. Compatability problems rule out still others; e.g., natural starches. Also, as mentioned above, numerous thickening agents address the first three problems; e.g., viscosity, storage stability and coating ability but do not perform well with respect to the triple problems additionally solved by the present invention: Demulsibility, Viscosity Maintenance and Sieve.

Preferred thickening agents for the present invention are acrylic polymers and polyacrylamide preferably those which have molecular weights above about 1,000,000, more preferably in the range from about 5,000,000 to about 30,000,000, most preferably about 10,000,000 to 25,000,000 or more. Additionally, such polymers should, when mixed into emulsifier water solution, provide a viscosity of about 5 to about 50, more preferably from 10 to about 30, and most preferably from 15 to about 25 Saybolt Furol seconds by ASTM test D244. Such viscosities are measured in the water-emulsifying agent-polymer system. However, mere molecular weight and viscosity (thickening) have been found not to be sufficient to provide the desired high levels of demulsibility, viscosity maintenance and "sieve" prevention.

While the invention should not be held to a particular theory, it appears possible that the high demulsibility of the emulsions of the present invention stems at least in part from the ability of the polymers and possibly the polymer-emulsifier combination, to act as a preferential flocculator in which the polymer molecules surround and possibly embrace the asphalt droplets.

Preparation Techniques

The emulsions of the present invention can be prepared by a wide variety of techniques but would ordinarily be prepared by mixing together the water, or at least a portion of the water, with the emulsifying agent and the polymer until this mixture is homogeneous and adding the asphalt to the water-emulsifying agent-polymer mixture. It has been found that the addition of the asphalt to the water, rather than vice versa is important in order to maintain the asphalt as an oil-in-water emulsion rather than preparing an undesired water-in-oil emulsion. That is, the water should be the continuous phase.

Temperatures

The temperature for mixing the ingredients is not narrowly critical but will generally be in the range from about 16° C. to 54° C. (about 60° to about 130° F.), more preferably from 27° to 49° C. (about 80° to about 120° F.) and most preferably from 38° to 43° C. (about 100° to about 110° F.). These temperatures refer to the water-emulsifying agent-polymer solution and the asphalt temperature will generally be higher; e.g., in the range of from about 121° to 160° C. (250° to about 320° F.) and more preferably from about 132° to 143° C. (270° to about 290° F.) in order to permit good pumpability and ease of dispersion of the asphalt. Pressure could be ambient but in general pressures will be in the range of 80–100 psi.

Apparatus

The apparatus employed should be capable of providing high shear agitation to insure good dispersion of the asphalt in the other liquid components. Particularly preferred for this purpose are colloid mills; e.g., those manufactured by P&O Machine Shop of Savannah, Georgia or by Chemicolloid Laboratories Inc. Garden City Park, N.J. Other high shear mixing devices; e.g., counter-rotating blade mixers of the dispersator type made by Charles Ross and Son Company could be used. Suitable devices are made by the Manton-Gaulin Manufacturing Co. of Everett, Mass. and the Lancaster Chemical Co. of Carlstadt, N.J. Positive displacement gear-pumps are preferably used to transport the asphalt into the mixing vessel which contains the other liquid ingredients through moving cavity pumps; e.g., the Moyno pump made by Robbins & Meyers, Inc., Springfield, OH 45501, and any other high pressure positive displacement type pump can be utilized.

Storage Facilities

Preferred storage vessels will be relatively slender so that the vertical dimension is accentuated to keep top-effects; e.g., skin formation, minimized as a percentage of the total volume of the emulsion.

EXAMPLES

Although the examples which follow are to be understood as being merely exemplary of the invention, the invention will be made more clear to those skilled in the art by a reading of the examples.

Example I: (Asphalt emulsions according to the present invention.)

A saponified tall oil is added to water to provide a concentration of 1.5% by weight in the water. To this water-emulsifying agent solution is added 0.9% by weight thickening agent designated as Nalco 9SS-068 and manufactured by the Nalco Chemical Company, 1801 Diehl Road, Naperville, Ill. The addition is accompanied by stirring and the stirring is continued until a uniform solution is achieved. The water-emulsifying agent-thickener is brought to about 35° C. (95° F.) before introduction into the mill. The resulting mixture is introduced to an Eppenbach colloid mill model no. QV6-2 manufactured by Gifford-Wood Company of Hudson, New York with simultaneous introduction of the hot 121° C. (250° F.) asphalt. The asphalt is an AC2.5 type designated as "emulsion base" asphalt having a penetration of 185 mm/10. The colloid mill discharges into a storage vessel. The resulting emulsion tests separately as follows: After 18 hours storage at 65°±6° C. (150°±10° F.), after 10 days storage at 65°±6° C. (150°±10° F.) and 10 days storage at room temperature.

|  | 18 hrs. at 65 ± 6° C. | 10 days at 65 ± 6° C. | 10 days at room temperature |
|---|---|---|---|
| Sieve, % | 0.01 | 0.01 | 0.01 |
| Viscosity, Saybolt Furol Seconds | 125.0 | 130.0 | 127.0 |
| Distillation - % Residue | 63.5 | 63.7 | 63.8 |
| Penetration Residue, mm/10 | 157.0 | 160.0 | 159.0 |
| Demulsibility, % | 68.0 | 71.0 | 65.0 |
| 24 Hr. Storage Stability, % | 0.1 | 0.2 | 0.1 |

The above test results indicates that the material meets virtually all county, state and federal highway specifications, has excellent storage life, passes the demulsibility test and is resistant to the formation of sieve and has stable viscosity over projected periods of time.

Example II–XII (Comparison of Demulsibility of Invention with that of Common Thickening Agents).

Different concentrations in the thickening agent of Example 1 in emulsions produced according to the procedure of Example 1 are prepared and their demulsibility values i.e. the resistance of the asphalt emulsions to agglomeration in the presence of 0.02 normal Ca++ introduced as calcium chloride, are determined for comparison to similar emulsions which are prepared using the procedure of Example 1 but substituting as the thickening agent hydroxy ethylcellulose (commercial grade) and polyacrylic acid (commercial grade), respectively. The preparations with the three thickening agents are designed to have approximately equal thickening agent cost for at least the initial (lower concentration) points.

The results, as illustrated in the FIGURE, show the substantial improvement in demulsibility provided by the compositions of the invention.

Results are as tabulated in Table 1, and shown in the FIGURE which plots percent Demulsibility (by ASTM D244) versus weight percent of thickening agent (100% solids basis).

TABLE I

| Example | II | III | IV | V | VI | VII | VIII | IX | X | XI | XII |
|---|---|---|---|---|---|---|---|---|---|---|---|
| Emulsifier, % Aqueous Phase | 1.2 | 1.2 | 1.2 | 1.2 | 1.2 | 1.2 | 1.2 | 1.2 | 1.2 | 1.2 | 1.2 |
| Hydroxyethyl Cellulose, % Aqueous Phase | 0.2 | 0.33 | 0.47 | 0.6 | — | — | — | — | — | — | — |
| Polyacrylic Acid, % Aqueous Phase | — | — | — | — | 0.14 | 0.2 | 0.26 | — | — | — | — |
| Acrylic Polymer Solids of Example 1, % Aq. Ph. (Nalco 9SS-068) | — | — | — | — | — | — | — | 0.3 | 0.37 | 0.42 | 0.53 |
| Demulsibility, % | 36.3 | 40.6 | 39.1 | 33.7 | 27.7 | 21.3 | 18.7 | 56.3 | 68.4 | 77.3 | 79.2 |
| Residue, % | 63.1 | 63.3 | 63.0 | 63.2 | 63.5 | 63.9 | 63.7 | 64 | 64 | 64 | 63.8 |

Modifications of the Invention

It will be understood by those skilled in the art that the invention is subject to a wide variety of modifications and variations without departing from the spirit of the invention including use in medium and slow set anionic asphalt emulsions. By changing the nature of the thickener; e.g., to an aqueous blend acrylamide-quatenary dimethylaminoethyl methacrylate sulfate the invention is useful in cationic asphalt emulsions. The list of monomers which can be homo or copolymerized to polymers useful in this invention includes but is not limited to: acrylic acid, acrylamides, acrylic and methacrylic acids and their esters.

What is claimed is:

1. Asphalt emulsions having demulsibility values of at least about 60%, and viscosity maintenance values of at least about 20 to about 400 Saybolt Furol Seconds over about 240 hours at 65°±10° C. comprising in combination; water, asphalt of penetration in the range of from about 75 to about 300 mm/10, emulsifying agents compatible with said asphalt, and from about 0.05 to about 1.0 percent by weight based on the total weight of said emulsion of an acrylic polymer having molecular weight of above about 1,000,000.

2. An emulsion of claim 1 wherein the emulsion is an oil in water emulsion.

3. An emulsion of claim 1 wherein the polyacrylamide has a molecular weight in the range of from about 5,000,000 to about 30,000,000.

4. An emulsion of claim 1, wherein the acrylic polymer comprises a copolymer of acrylic acid and acrylamide.

5. An emulsion of claim 2, wherein the acrylic polymer comprises a copolymer of acrylic acid and acrylamide.

6. An emulsion of claim 3, wherein the acrylic polymer comprises a copolymer of acrylic acid and acrylamide.

7. A process for the manufacture of the compositions of claim 1 comprising:
   (A) Forming a mixture comprising a major portion of said water and said emulsifying agent;
   (B) Adding to said above mixture a major portion of said acrylic polymer and thereafter adding any remaining portions of said water, emulsifying agent and acrylic polymer and mixing thoroughly;
   (C) Adding said asphalt to the mixture thus above formed with high shear agitation for time sufficient to thoroughly disperse said asphalt into said mixture whereby there is formed an asphalt-in-water emulsion.

8. A process for the manufacture of the compositions of claim 2 comprising:
   (A) Forming a mixture comprising a major portion of said water and said acrylic polymers;
   (B) Adding to said above mixture a major portion of said emulsifying agent and thereafter adding any remaining portions of said water, acrylic polymers and emulsifying agent and mixing thoroughly;
   (C) Adding said asphalt to the mixture thus above formed with high shear agitation for time sufficient to thoroughly disperse said asphalt into said mixture whereby there is formed an asphalt-in-water emulsion.

9. An emulsion of claim 7, wherein the acrylic polymer comprises a copolymer of acrylic acid and acrylamide.

10. An emulsion of claim 8, wherein the acrylic polymer comprises a copolymer of acrylic acid and acrylamide.

* * * * *